United States Patent [19]

Heggebo et al.

[11] 4,323,386

[45] Apr. 6, 1982

[54] METHOD OF MANUFACTURING NP- OR NPK-CONTAINING FERTILIZERS FROM MAGNESIUM CONTAINING PHOSPHATE

[75] Inventors: Trygve Heggebø, Porsgrunn; Arne Conradsen, Heistad, both of Norway

[73] Assignee: Norsk Hydro a.s., Oslo, Norway

[21] Appl. No.: 227,973

[22] Filed: Jan. 23, 1981

Related U.S. Application Data

[63] Continuation of Ser. No. 50,217, Jun. 20, 1979, abandoned.

[51] Int. Cl.$^3$ .............................................. C05B 7/00
[52] U.S. Cl. ........................................ 71/35; 71/39; 71/43; 71/50; 71/64.3; 71/64.03; 71/64.06
[58] Field of Search .............. 71/39, 35, 50, 43, 64 D, 71/34, 37, 64.3, 53, 64.6; 423/167, 169, 312, 305

[56] References Cited

U.S. PATENT DOCUMENTS

| | | | |
|---|---|---|---|
| 4,008,309 | 2/1977 | Moldovan et al. | 423/167 |
| 4,152,397 | 5/1979 | Wolstein | 423/167 |
| 4,175,944 | 11/1979 | Johnson | 71/39 |

FOREIGN PATENT DOCUMENTS

| | | |
|---|---|---|
| 2402758 | 7/1974 | Fed. Rep. of Germany . |
| 2363096 | 7/1975 | Fed. Rep. of Germany .......... 71/39 |
| 2531519 | 1/1977 | Fed. Rep. of Germany . |
| 2092692 | 1/1972 | France ................................. 71/39 |

OTHER PUBLICATIONS

Ando et al., "Ammoniated reactions of wet-process phosphoric acid", Nov. 1972, ISMA Technical Conf., Spain.

*Primary Examiner*—S. Leon Bashore
*Assistant Examiner*—Michael Goldman
*Attorney, Agent, or Firm*—Wenderoth, Lind & Ponack

[57] ABSTRACT

NP- or NPK-containing fertilizers are manufactured from low-grade phosphate ore digested by nitric acid. Substantial problems have been experienced during previous attempts to produce fertilizers from phosphate ore having a high content of magnesium. The problems relate to the solution's viscosity, which becomes extremely high during neutralization with ammonia of the mother liquor, obtained by removal of most of the calcium as calcium nitrate-tetrahydrate from the digested phosphate. The novel process solves the viscosity problems by adjusting the conditions during ammoniation and the subsequent evaporation before prilling or granulation. The adjustment is characterized in that a substantial part of the remaining calcium is kept outside the process itself, at least during the neutralization and evaporation stages.

6 Claims, No Drawings

METHOD OF MANUFACTURING NP- OR NPK-CONTAINING FERTILIZERS FROM MAGNESIUM CONTAINING PHOSPHATE

This is a continuation application of Ser. No. 50,217, filed June 20, 1979, now abandoned.

The present invention relates to a method of manufacturing NP- or NPK-containing fertilizer from phosphate ore containing more than 0.3 percent magnesium. The phosphate is digested by nitric acid, whereupon the major part of calcium is removed as calcium nitrate-tetrahydrate by crystallization and filtering. Calcium is removed in this manner until a Ca/P-ratio of about 0.35 is attained in the filtrate, to which ammonium nitrate may be added prior to neutralization by ammonia and subsequent evaporation before prilling or granulation.

Lately there has been an increased interest for expanding the basis for raw materials for the fertilizer industry. The amounts of easily accessible high grade phosphate ore are ever decreasing and there is increased interest for utilizing regionally occuring lower grade phosphates within the region in order to avoid import of phosphate ore.

One type of phosphate which exists in large amounts is the phosphates having relatively high contents of magnesium. There are for instance some phosphate resources in the USSR, and Algeria having a magnesium content of 0.5–1.4 percent by weight, calculated as Mg. Contrary to this, commonly used phosphates contain less than 0.3 percent by weight of magnesium.

Phosphate ore having a high content of magnesium has to some extent been tested in the fertilizer industry, but so far such phosphates have created large processing problems. such phosphates have especially proved to cause high viscosities in some stages of the process.

In U.S. Pat. No. 3,493,340 there is described a method which has been tried in order to make it possible to utilize phosphate ore having a high content of magnesium. According to this patent the major part of the magnesium is leached out by sulphuric acid prior to the main digestion of the phosphate. The disadvantage of this method is that the total amount of the phosphate ore has to be treated in an extra digesting step, and some of the phosphate in the phosphate ore will necessarily be lost in this step.

The problems related to magnesium-containing phosphate ore are also discussed in the paper "Ammoniation reactions of wet-process phosphoric acid" by J. Ando and T. Akiyama, Chuo University, Japan, published during the ISMA Technical Conference at Seville, Spain, 20th–24th of Nov. 1972.

This paper describes some experiments regarding ammoniation of wet-process phosphoric acid. The influence of magnesium in the phosphoric acid is especially discussed at page 5–6 and 11. The experiments showed that by ammoniating phosphoric acid having a molar ratio $MgO/P_2O_5=0.37$ the viscosity became 9,000 centipoise at pH 6. Also the fluorine content proved to have some influence. The conclusion drawn in the paper is that addition of small amounts of magnesium to phosphoric acid will increase the viscosity substantially during ammoniation, while ordinary wet-process phosphoric acid gives a low viscosity. It is further stated in the same paper, page 11, that if fluorine is present in addition to magnesium in the phosphoric acid, the viscosity will rise even higher than if only magnesium is present.

According to the above descriptions, magnesium-containing phosphate ore will cause substantial viscosity problems during manufacture of phosphoric acid or fertilizer products. There exists no simple explanations for the increase in viscosity. As the problems arise as a result of the high content of magnesium, it seems obvious that magnesium should be removed at the earliest possible stage in the process, i.e. as proposed in the above cited literature.

The object of the present invention was to make it possible to utilize phosphate ore having a high magnesium content in a nitrophosphate process, especially in the so-called Odda process. Another object was to find a way of using said type of phosphate without having to alter the process substantially and without increasing the cost of the phosphate by expensive up-grading prior to the main acidulation. It was a further object to arrive at a simple process which even by utilizing said type of phosphate had the same degree of freedom regarding product composition and formation of particles, i.e. being free to choose between prilling and granulation as is the case when using high grade phosphate in the conventional Odda process.

Generally, the Odda process can be described as a process by which phosphate ore is acidulated by concentrated nitric acid, about 58 percent, and the solution is cooled in order to remove the major part of calcium as calcium nitrate-tetrahydrate. The mother liquor obtained after filtration of the calcium nitrate can then be further processed to phosporic acid and/or NP- or NPK-fertilizers. The filtered calcium nitrate can be converted to calcium carbonate and ammonium nitrate which is concentrated by evaporation. The mother liquor is neutralized by ammonia and ammonium nitrate may be added to increase the N/P-ratio. The neutralized lye is thereupon concentrated by evaporation. The degree of evaporation depends on whether the final product shall be produced by prilling or granulation.

The inventors tried to apply phosphate ore having a high magnesium content in the Odda process, and that described in the literature in this field was soon confirmed, namely that such phosphates caused viscosity problems in some stages of the process, especially during neutralization and evaporation.

However, neutralization could be carried out if it was performed in several steps and the process was limited to a high $N/P_2O_5$-ratio in the finally neutralized lye. But the viscosity became unusually high in the neutralization stage and specially effective stirring means had to be used. The process was further limited during the evaporation by using lye having this high viscosity. It was thus impossible to evaporate this lye to such an extent that it was applicable for prilling because the viscosity became too high.

Because the high magnesium content first caused problems in the neutralization stage, it seemed possible to use the original process unaltered until this stage was reached. Removal of magnesium would, however, be very difficult without substantial loss of valuable compounds in the lye.

Some preliminary research was carried out in order to survey the influence of the various contaminants present in the phosphate ore. It was found that the content of iron, aluminium, silicon and fluorine had no determining effect on those problems which this type of phosphate caused. It was surprisingly found, however, that artificially made mother liquor to which magnesium was added, did not cause any problems during neutralization and evaporation. Several tests with this lye were therefore made, and now calcium also was added in amounts corresponding to the calcium content usually present in the mother liquor of the Odda process. It was found during these last tests that the same viscosity problems arose as those experienced during application of phosphate ore having a high magnesium content. These tests accordingly indicated that removal of calcium from the mother liquor could be one way of getting around the problems, and therefore such experiments were carried out.

Removal of calcium by crystallization to a Ca/P-ratio below 0.35 is not achievable in practice, and therefore the remaining calcium had to be removed by other methods. Precipitation of calcium and subsequent filtration of the gypsum could be one way of doing it. A substantial part of the calcium in the mother liquor, i.e. the filtrate attained upon calcium nitrate filtration, was removed from the process by addition of sulphate, preferably in the form of sulphuric acid. The filtered sulphate (gypsum) was preferably returned to the process at the stage subsequent to the evaporation stage.

Problems related to depositing or working-up of the gypsum are avoided by returning the calcium sulphate to the process. Environmental regulations are making it ever more difficult and expensive to deposit gypsum from the fertilizer industry. This type of gypsum can not be readily sold either, because of its content of contaminants. Further, it is often an advantage to be able to offer fertilizers having calcium and sulphur in amounts corresponding to that obtained by returning calcium sulphate to the process as described above.

The special features of the process according to the invention are that a substantial part of the remaining calcium in the mother liquor is kept outside the process itself at least during the neutralization and evaporation stages by reducing the calcium content of the mother liquor to a Ca/P-ratio of 0.01–0.15 by precipitation with sulphate and removal by filtration. The filtrate is then neutralized to a N/P$_2$O$_5$-ratio of at least 0.5. The removed calcium in the form of calcium sulphate is preferably returned to the process subsequent to the evaporation stage and before prilling or granulation.

The invention and its effects are more clearly explained in the following examples. These examples show the results from experiments carried out in a pilot plant using phosphate ore having a high content of magnesium. The examples show application of said phosphates in a conventional Odda process and in a modified nitrophosphate process according to the invention.

EXAMPLE 1

Phosphate ore having a Mg-content of 1.4%, 13.6% P and 7.9% of material which did not dissolve in acid was leached by 57% HNO$_3$ in two steps in a pilot plant. The digestion ratio corresponded to about 1.25 ton/ton phosphate.

The resulting solution was cooled to about −5° C. in the crystallizers, and the thereby formed calcium nitrate-tetrahydrate crystals were removed by filtration. The filtrate had a Ca/P-ratio of about 0.45 and a N/P-ratio of about 0.7. Further analysis showed that all the iron, aluminum and magnesium supplied by the phosphate ore were dissolved in this filtrate. Neutralization by ammonia was carried out in two steps applying pH=2.8 in the first neutralizing vessel and pH=5.6 in the second neutralizing vessel. The viscosity of vessel 2 was 4,000–5,000 centipoise.

In a second series of experiments the neutralization was carried out in three steps. The less viscous lyes were attained by applying pH of 1.8, 3 and 5.8 respectively in the vessels. Then the viscosity of vessel 3 was measured as 2,000–2,500 centipoise. In the finally neutralized lye the ratio N/P$_2$O$_5$=2. By lowering this ratio to N/P$_2$O$_5$=1, the viscosity in vessel 3 increased to 5,000–7,500 centipoise.

The viscosity of the lye was halved upon a respite of one hour. Evaporation of neutralized lye having N/P$_2$O$_5$=2 gave the following results:

| Temp. °C. | pH | Viscosity centipoise | H$_2$O % |
|---|---|---|---|
| 124 | 5.8 | 1,000 | 16.2 |
| 144 | | | 7.2 |
| 158 | 5.8 | 3,500–5,000 | 3.7–2.9 |
| 180 | 4.9 | ca. 15,000 | 0.9 |

EXAMPLE 2

In another experiment phosphate ore containing 1.36% Mg and 17.13% P was used.

Prior to the neutraliztion stage, the process was carried out as in example 1.

By neutralizing in two steps to a N/P$_2$O$_5$-ratio=1 in the finally neutralized lye, the viscosity in the last neturalizing vessel became 6,000–8,000 centipoise.

Neutralization in three steps and ending up with the same N/P$_2$O$_5$-ratio resulted in a viscosity of 4,000–5,000 centipoise in the last neutralizing vessel.

Application of N/P$_2$O$_5$=2 in the finally neutralized lye resulted in a viscosity of 2,000–2,500 centipoise.

Evaporation of this lye to a water content of 1% H$_2$O made the viscosity increase to 10,000 centipoise.

EXAMPLE 3

Phosphate ore of the same type as in example 1 was treated as in that example as far as the crystallization and filtration of calcium nitrate. Then concentrated sulphuric acid was added to the lye from the filtration stage and precipitation was carried out at 60° C. The gypsum thereby formed was removed by filtration and the filtrate was analyzed. These analyses showed that the Ca/P-ratio was reduced from 0.35 to 0.02. The Mg/P-ratio was reduced about 20%.

This lye was neutralized to N/P$_2$O$_5$=1 in three steps. The viscosity in the last neutralizing vessel was measured as 40–80 centipoise.

In order to control the above results, calcium nitrate crystals were added to the lye from which gypsum had been removed. The Ca/P-ratio was increased from 0.02 to 0.35 by this addition of calcium nitrate. Neutralization of thus adjusted lye produced a viscosity of 2,500 centipoise in the last neutralization vessel.

Evaporation of neutralized lye having a Ca/P=0.02, N/P$_2$O$_5$=1 and Mg/P=0.08–0.07 was carried out at 180° C. without any sign of thickening problems. The lye was evaporated to a water content of 0.6% H$_2$O.

Because deposition of gypsum would be avoided, experiments were made to return the removed calcium to the process. Incorporation of the gypsum in the process before the evaporation stage proved to be very difficult because it caused a large increase in viscosity during the evaporation.

Another attempt was made to incorporate the gypsum, but now it was added to evaporated NP-lye. The gypsum was washed and dried before it was added to the lye at 180° C. The viscosity of the melt (evaporated lye) remained low, even after 10 minutes it was only 1,000 centipoise, i.e. well within the viscosity range which is considered suited for prilling.

EXAMPLE 4

Phosphate ore of the same type as in examnple 2 was treated as in that example as far as the crystallization and filtration of calcium nitrate. Then concentrated sulphuric acid was added to the lye from the filtration stage, and precipitated gypsum was removed by filtration. The calcium content of the lye was thereby reduced from a Ca/P-ratio of 0.39 to 0.02. The Mg/P-ratio was reduced from 0.08 to 0.07.

The lye was neutralized in two steps subsequent to the gypsum removal. The viscosity was measured as about 50 centipoise in the second vessel. Finally neutralized lye had a $N/P_2O_5=0.7$. This lye was then evaporated, and at 180° C. and a water content of 1% $H_2O$ the viscosity was measured as about 150 centipoise.

Further experiments showed that the lye could be neutralized without difficulties if the lye prior to neutralization had a Ca/P-ratio of about 0.01–0.15, and it may simultaneously have a ratio Mg/P>0.02. Experiments were carried out with lyes having Mg/P=0.62 without registering any difficulties. Even higher Mg/P-ratios did not seem to cause any substantial problems during neutralization and evaporation.

In all examples % is given as weight percent. The viscosities were measured by a Brookfield Syncro-Lectric Viscometer RTV, and the speed was 20 rpm using spindle No. 6.

As shown in the example 1 and 2 the application of phosphate ore having a high content of magnesium is rather limited in the conventional Odda process. First of all the only feasible way of neutralizing the lye is to carry it out in three steps, and even then the viscosity will be 1,000–2,500 centipoise in the last neutralizing vessel. However, this can only be achieved by restricting the ratio $N/P_2O_5 \geq 2$ in the finally neutralized lye. Production of finally neutralized lye having for instance $N/P_2O_5=1$ will be impossible because that will result in too high viscosity during neutralization, and to an even greater extent during evaporation.

Evaporation of finally neutralized lye having $N/P_2O_5=2$ is possible, but the viscosity will then increase to 10,000–15,000 centipoise when the water content is getting near to 1% $H_2O$, and the problems related to this would be evident. Further, it is not possible to evaporate thus produced lye to such an extent that a melt is attained having sufficiently low water and viscosity rendering it suitable for prilling.

The examples show that by applying the process according to the invention, application of phosphate ore having a high content of magnesium has become feasible.

The effect of keeping most of the calcium of the lye out of the process itself during neteuralization and evaporation by means of sulphate precipitation, is quite clear from the low viscosities measured in the neutralization vessels and at the evaporation stage. Viscosities of 40–80 centipoise in the last neutralizing vessel is of the same order as that attained when using high grade phosphate ore, for instance Kola-phosphate having less than 0.3% Mg.

High viscosity values were also avoided during evaporation, the order of magnitude being 150–1,000 centipoise, i.e. about the same as when Kola-phosphate is used.

An essential advantage of the invention is that it enables production of finally neutralized lye having $N/P_2O_5$-ratios as low as 0.5–2, even when using phosphate ore having a high content of magnesium. This results in the same degree of freedom regarding composition of the end products as high grade phosphates give.

Another essential advantage gained by the invention is the freedom to choose between prilling and granulation. A further advantage of the invention is that the process does not necessarily produce a by-product which has to be deposited or requires working-up. The calcium sulphate removed from the process before the neutralization stage can again be incorporated in the process after the evaporation stage, and will then be found in the end product.

The invention has made is possible to use phosphate ore having a magnesium content greater than 0.3% Mg in a nitrophosphate process without loss of degree of freedom regarding product composition or freedom to choose between prilling and granulation. The extra stages which the process implies are simple ones, and can be based on application of known equipment.

What is claimed is:

1. In a method of manufacturing NP- or NPK-containing fertilizer from phosphate ore having a magnesium content of more than 0.3 percent by weight, which comprises subjecting said ore to digestion with nitric acid, removing calcium, as calcium nitrate-tetrahydrate, from the digestion mixture by means of crystallization and filtration until the filtrate resulting from said filtration has a Ca/P-ratio of about 0.35, subjecting said filtrate to neutralization with ammonia, directly subjecting the neutralized filtrate to evaporation, and prilling or granulating the product resulting from said evaporation, the improvement wherein the method is carried out without causing viscosity problems related to the high magnesium content in the ore, by (1) reducing the Ca/P-ratio in said filtrate resulting from said filtration from about 0.35 to 0.01–0.15 by adding sulphuric acid or a sulphate to said filtrate to precipitate calcium in said filtrate, as calcium sulphate, and removing said calcium sulphate from the resultant mixture, and (2) subjecting said filtrate having a Ca/P-ratio of 0.01–0.15 to said neutralization with ammonia until said filtrate has an $N/P_2O_5$- ratio of 0.5–2.

2. A method according to claim 1, wherein ammonium nitrate is added to said filtrate, having a Ca/P-ratio of 0.01–0.15, prior to subjecting said filtrate to said neutralization.

3. A method according to claim 1 or 2, wherein said removed calcium sulphate is recycled to said product resulting from said evaporation, prior to prilling or granulating said product.

4. A method according to claim 1, wherein said phosphate ore has a magnesium content of 0.5–1.4 percent by weight.

5. A method according to claim 1, wherein said neutralized filtrate has a viscosity of 40–80 centipoise.

6. A method according to claim 1, wherein said product resulting from said evaporation has a viscosity of 150–1,000 centipoise.

* * * * *